M. R. JENKINS.
SPRING STAKE.
APPLICATION FILED JAN. 18, 1907.
937,942.
Patented Oct. 26, 1909.
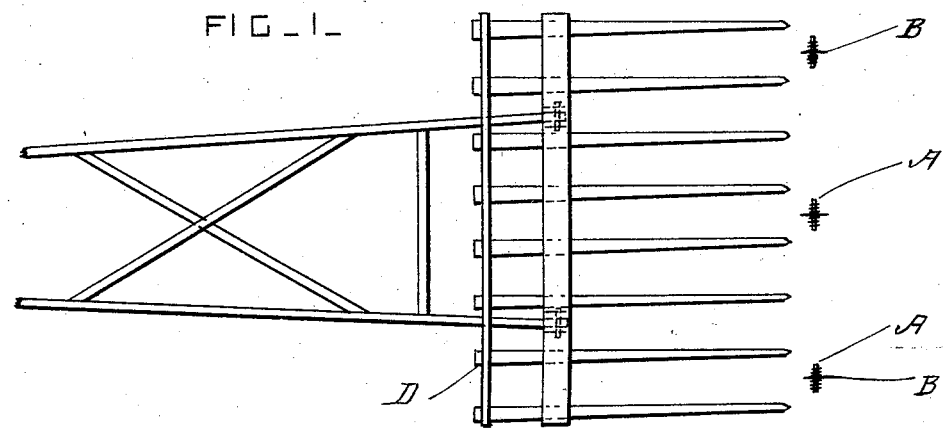
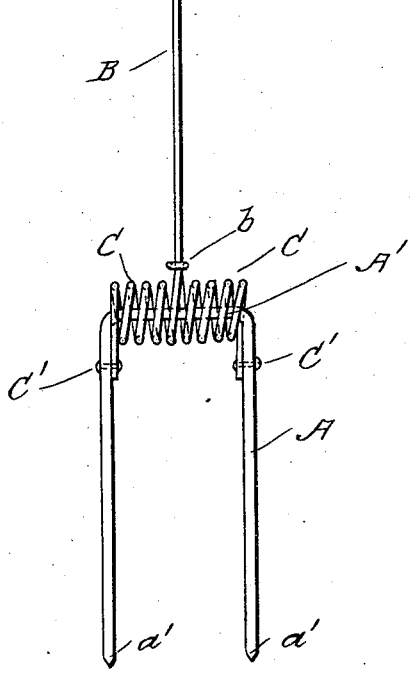
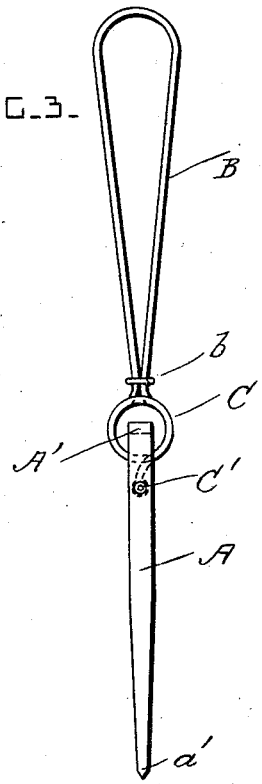
WITNESSES:
L. B. Middleton
Theodore Mack
INVENTOR
Marion R. Jenkins.
By Herbert W. Jenner.
Attorney

UNITED STATES PATENT OFFICE.

MARION R. JENKINS, OF BROWNING, MISSOURI.

SPRING-STAKE.

937,942.

Specification of Letters Patent.   Patented Oct. 26, 1909.

Application filed January 18, 1907.   Serial No. 352,914.

*To all whom it may concern:*

Be it known that I, MARION R. JENKINS, a citizen of the United States, residing at Browning, in the county of Linn and State of Missouri, have invented certain new and useful Improvements in Spring-Stakes; and I do hereby declare the following to be a full, clear, and exact description of the invention, such as will enable others skilled in the art to which it appertains to make and use the same.

This invention relates to guard stakes used in connection with hay-stackers and other similar machines to retain the hay on the fork; and it consists in the novel construction and combination of the parts hereinafter fully described and claimed.

In the drawings, Figure 1 is a plan view of the fork of a hay-stacker, showing the application of these stakes. Fig. 2 is a front view of a spring stake. Fig. 3 is a side view of the same.

A is an anchor-piece or base, preferably formed in the shape of a large staple and provided with pointed ends $a'$ which are driven into the ground.

B is a loop shaped arm of spring metal the lower end portions of which are provided with a link or clip $b$ for securing them together.

C are two helical springs formed of the end portions of the rod from which the arm is made. These two springs are coiled about the top bar $A'$ of the anchor-piece, and their extreme ends are secured to the side portions of the said anchor-piece by rivets $C'$ or other approved fastening devices. The arm B is normally supported in a vertical position and can be turned about the part $A'$ as a center in each direction. The arm is also free to move to a limited extent in any other direction as the coils of its supporting springs do not touch the bar about which they are arranged.

These stakes are driven into the ground in front of the tines of a fork of a hay-stacker, D, of any approved construction. The hay is dragged onto the fork by any suitable machine and the spring supported arms bend in front of the hay and allow it to pass over them, and then retain it on the fork.

What I claim is:

1. In a spring stake, the combination, with an anchor-portion formed like a staple and provided with two pointed ends for driving into the ground, of a single spring supported arm which projects upwardly from the top part of the said anchor-portion.

2. The combination, with an anchor-stake for driving into the ground, of a loop-shaped arm of spring metal having its end portions wound helically to form two series of spring coils, and means for securing the two opposite end coils of the said series to the said stake.

3. The combination, with an anchor-stake for driving into the ground, of a loop-shaped arm of spring metal having its end portions wound helically to form two series of spring coils, a clip encircling the lower parts of the said arm and preventing them from spreading, and means for securing the two opposite end coils of the said series to the said stake.

4. As an article of manufacture, a hay retainer for use in connection with the fork of a hay stacker, the same comprising a stake adapted to be driven into the ground and an upwardly projecting yielding finger pivotally mounted directly on the upper end of the said stake.

5. The combination with a holder, of a hay retainer consisting of a finger, a spiral spring extending laterally upon each side of said finger, and means for securing the free ends of said spring in the holder.

In testimony whereof I have affixed my signature in the presence of two witnesses.

MARION R. JENKINS.

Witnesses:
 JAMES P. BOLLING,
 C. E. MURPHY.